Aug. 7, 1956  M. E. HATCHER  2,757,960
LAWN SPRINKLER
Filed May 17, 1955
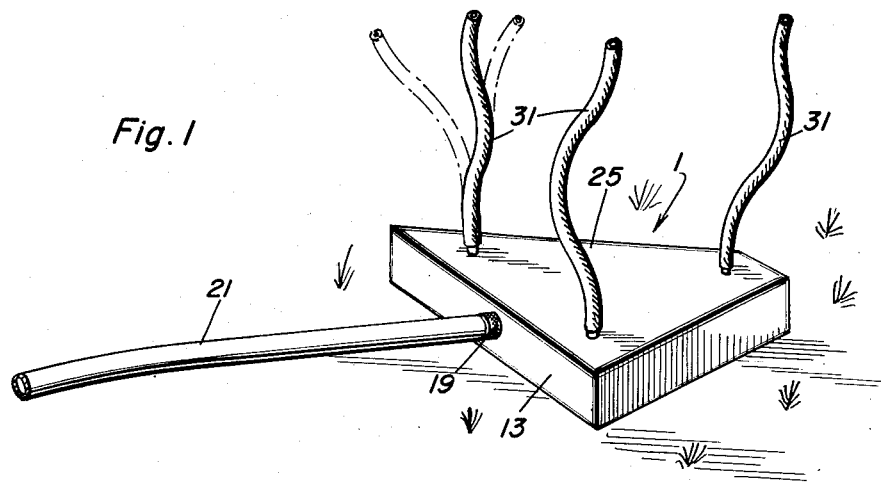
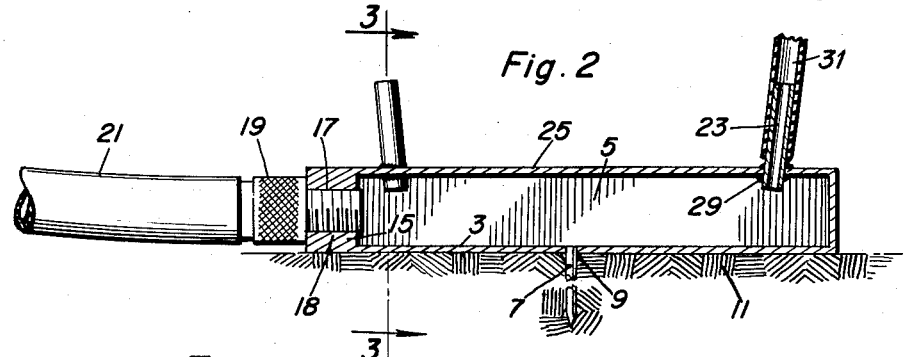
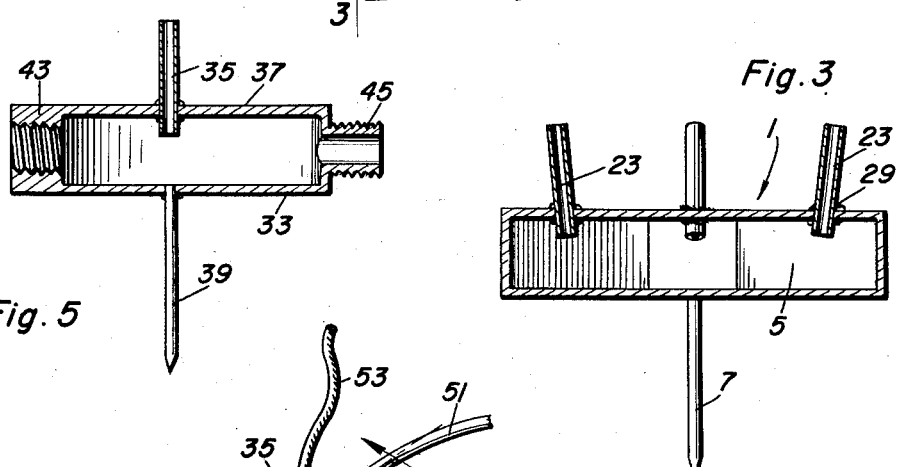
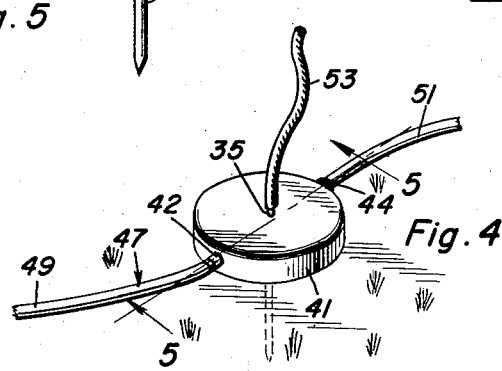
Merrel E. Hatcher
INVENTOR.

United States Patent Office 2,757,960
Patented Aug. 7, 1956

2,757,960

LAWN SPRINKLER

Merrel E. Hatcher, Richland, Wash.

Application May 17, 1955, Serial No. 508,860

1 Claim. (Cl. 299—65)

My invention relates to improvements in sprinkler devices for lawns and the like.

The primary object of my invention is to provide a portable sprinkler device for connection to a lawn hose and anchoring to the ground and which embodies flexible sprinkling hose sections for vibrating and gyrating in the response to water under pressure discharging therethrough so as to sprinkle a comparatively large area of a lawn and whereby rotary parts in the sprinkler are obviated and the construction thereof is simplified.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in perspective of my improved sprinkler in the preferred embodiment thereof;

Figure 2 is an enlarged fragmentary view in longitudinal section partly broken away;

Figure 3 is a view in transverse section taken on the line 3—3 of Figure 2;

Figure 4 is a fragmentary view in perspective of a modified form of my improved sprinkler; and Figure 5 is an enlarged view in longitudinal section taken on the line 5—5 of Figure 4.

Referring to the drawings by numerals according to my invention, the preferred embodiment thereof, comprises a flat, metal hollow casing 1 having a bottom wall 3 adapted to rest on a lawn, said casing being preferably triangular and of any suitable size to render it readily portable and forming a water pressure chamber 5 therein. A central bottom prong 7 secured on and welded, as at 9, to the bottom wall 3 depends therefrom and is provided with a pointed end for driving of the prong 7 into the ground 11 to anchor the casing 1 in a desired position on the lawn.

One side wall 13 of the casing 1 is thickened, as at 15, and provided with a horizontal threaded bore 17 forming a female hose coupling 18 for a conventional male hose coupling 19 on a water hose 21 and whereby water under pressure is introduced into the chamber 5.

A plurality of upstanding tubular discharge nipples 23 are provided on the top wall 25 of the casing 1 to extend therethrough with lower ends welded to the top wall 27, as at 29. The discharge nipples flare relatively to slant laterally outwardly of the sides of the casing 1.

A plurality of short lengths of small discharge hose sections 31 of soft rubber or the like to render the same highly flexible, have the lower ends thereof sleeved with a friction fit on the nipples 23. The discharge hose sections 31 may be of any desired length suitable for a purpose presently seen.

When the described sprinkler is coupled to the hose 21 and anchored to the ground, as described, the hose 21 being connected to a source of water under pressure, water issues from the chamber 5 through the nipples 23 and discharges through the hose sections 31 which in response to the passage of water therethrough vibrate and oscillate so that they whip around and gyrate in the air in upright positions to throw the water over a wide area of the lawn. The casing 1 being triangular is of polygonal shape with sides and corners adapted to catch in grass and prevent the casing from creeping over a lawn.

In the modified form of the invention, the casing 33 is preferably circular and provided with a central single discharge nipple 35 secured in the top wall 37, like the nipples 23, but opposite the prong 39. The casing 33 is provided in its side wall 41 with a female hose coupling 43, like the coupling 18, and with a male hose coupling 45 in said wall diametrically opposite the coupling 43 so that, as illustrated in Figure 4, said casing may be interposed in a hose line 47 composed of sections 49, 51, and couplings 42, 44 complemental to couplings 43, 45. As will be seen, a plurality of these sprinklers may be used in a hose line having a number of hose sections adapted to be connected by male and female couplings. A single discharge hose section 53 like the sections 31 is provided on the nipple 35 to function like each section 31.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A lawn sprinkler comprising a flat bottom substantially triangular casing for resting on the ground and forming a water distributing chamber polygonal in shape for catching in grass to prevent it from creeping over a lawn, a hose coupling on one side of said casing attachable to a hose line for introducing water under pressure into said chamber, water discharge nipples extending upwardly from the corners of said casing to dispose the same in triangular arrangement and slanting outwardly thereof, and a plurality of short water discharge hose sections having lower ends sleeved onto said nipples for discharging water from the nipples, said hose sections being flexible for vibrating and gyrating on said nipples under the influence of water under pressure passing therethrough.

References Cited in the file of this patent

UNITED STATES PATENTS

| | | |
|---|---|---|
| 199,816 | Fiske | Jan. 29, 1878 |
| 212,368 | Fiske | Feb. 18, 1879 |
| 374,960 | Gumaer | Dec. 20, 1887 |
| 2,620,232 | King | Dec. 2, 1952 |

FOREIGN PATENTS

| | | |
|---|---|---|
| 17,834 | Great Britain | of 1888 |